United States Patent [19]

Kingen et al.

[11] Patent Number: 4,496,799

[45] Date of Patent: Jan. 29, 1985

[54] HANDSFREE TELEPHONE INSTRUMENT USING DIGITAL DIAL

[75] Inventors: Rickey W. Kingen, Corinth, Miss.; Robert H. Duncan, Memphis, Tenn.

[73] Assignee: International Telephone and Telegraph Corporation, New York, N.Y.

[21] Appl. No.: 448,978

[22] Filed: Dec. 13, 1982

[51] Int. Cl.³ ............................................. H04M 9/08
[52] U.S. Cl. ........................... 179/100 L; 179/84 VF; 179/90 K
[58] Field of Search ............. 179/81 B, 84 VF, 90 K, 179/100 L

[56] References Cited

U.S. PATENT DOCUMENTS

| | | | |
|---|---|---|---|
| 3,833,766 | 9/1974 | Eklof et al. | 179/81 B |
| 4,087,638 | 5/1978 | Hayes et al. | 179/90 K X |
| 4,315,108 | 2/1982 | Hoffman et al. | 179/84 VF |
| 4,406,926 | 9/1983 | Duncan | 179/90 K X |

FOREIGN PATENT DOCUMENTS 2279283  2/1976  France .................... 179/84 VF

*Primary Examiner*—Keith E. George
*Attorney, Agent, or Firm*—John T. O'Halloran; Jeffrey P. Morris; Alfred C. Hill

[57] ABSTRACT

Circuit for controlling the operation of a handsfree or loudspeaking telephone instrument. The circuit includes an integrated circuit dual tone multifrequency (DTMF) generator. When a button of the generator is depressed, and the instrument is in its handsfree mode, power feed to the generator and the speech network is activated. The tone generation circuitry and speech network are thereby connected in parallel with the handsfree hybrid. When the DTMF button is released, power to the speech network is discontinued. Further, when the instrument is in the handsfree mode, and in the non-dialing condition, the confidence tone muting resistance is shunted so that no voice signal attenuation to the handsfree hybrid can occur. The switching is protected against surges both in the handsfree and hookswitch on and off hook conditions and is protected against leakage at the start of the DTMF output.

12 Claims, 1 Drawing Figure

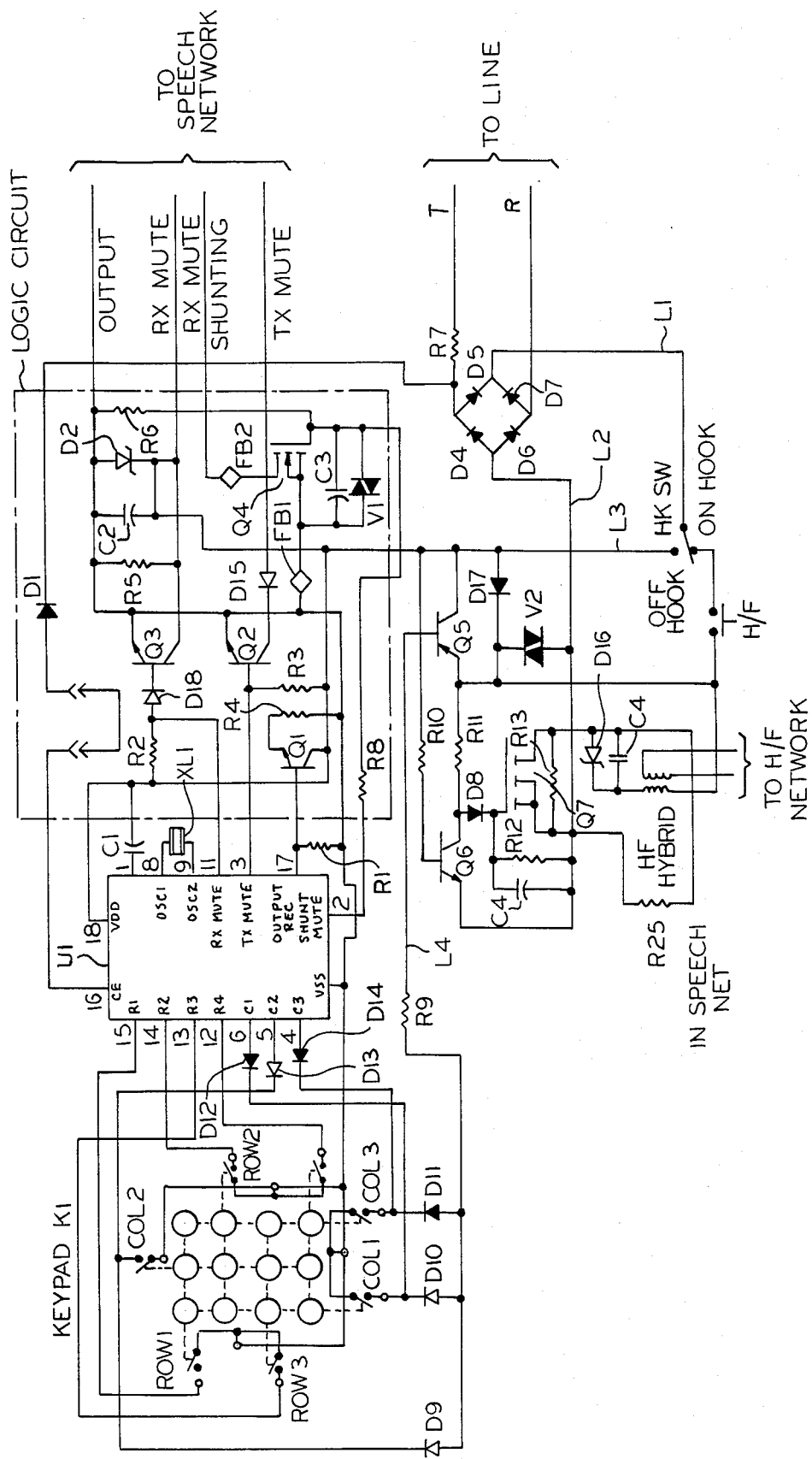

4,496,799

HANDSFREE TELEPHONE INSTRUMENT USING DIGITAL DIAL

BACKGROUND OF THE INVENTION

Loudspeaking or handsfree telephone instruments are well-known in the art to enable bidirectional telephone conversations to be undertaken through a microphone and a speaker at the station of one party to a conversation with the station telephone handset "on-hook". For example, such instruments and their operating circuits are shown in U.S. Pat. Nos. 3,725,585 to J. Moniak et al. issued Apr. 3, 1973 and 3,751,602 to R. L. Breeden issued Aug. 7, 1973.

Equally well-known are dual tone multi-frequency (DTMF) generators, as shown in U.S. Pat. Nos. 3,184,554 to Meacham et al. issued May 18, 1965 and 3,447,096 to J. L. Fischer et al. issued May 27, 1969. More recently such generators or push button dialers use digital techniques and are fabricated on an integrated circuit chip such as that sold by American Microsystems, Inc. (AMI) as the S 2859 or that sold by Mostek, Inc. as its MK 5090 series. In U.S. patent application Ser. No. 218,054 filed Dec. 19, 1980 now U.S. Pat. No. 4,406,926 and assigned to the assignee hereof, additions to the AMI circuit were shown. Such integrated circuit DTMF devices receive a selected input from a column and a row of the push button key pad. Using an oscillator, digital counter and ladder networks, the inputs are converted into digitally generated tones transmitted to a tone output terminal. Muting outputs for the receiver and transmitter of the telephone instrument are activated during tone output by logic from the integrated circuit. The chip is powered from the telephone line to which it is connected.

When a loudspeaking or handsfree telephone equipped with a DTMF device is in its normal mode, the device and the speech network are continuously powered from the line over the hookswitch when in its off-hook condition. In the handset (non-handsfree) mode, with the hookswitch on-hook, the telephone instrument is essentially disconnected from the line and there is no power to the instrument internal circuits including speech network.

When the instrument is in the handsfree mode with the hookswitch on-hook—the receiver, transmitter and speech network are all switched off by the hookswitch. The handsfree hybrid is across the line to enable bidirectional speech tranmission. The handsfree or loudspeaking network is powered continuously from an independent power source. The DTMF device is maintained inactive until one of the dialing buttons is depressed to actuate the common mechanical switch (assuming a mechanism as shown in U.S. Pat. No. 3,109,071 issued Oct. 29, 1963 to Mitchell et al.). No such common switch is provided with the integrated circuit digital DTMF devices currently being produced, for example, the S 2859 chip of AMI or variations thereof.

SUMMARY OF THE INVENTION

The invention is drawn to switching apparatus for controlling a handsfree or loudspeaking telephone instrument which uses a digital integrated circuit DTMF generator. The switching apparatus is disabled when the instrument is in the normal or handset active mode and is only enabled when the instrument is in the handsfree mode. In the handsfree mode, with the hookswitch in the on-hook or restored condition, the handsfree network is enabled and powered. An MOS transistor is maintained in its saturated, conducting state to short circuit the handsfree confidence tone muting resistance so that no signal attenuation can occur in the path to the handsfree hybrid. With the MOS transistor on, a low resistance path for direct current from the line is closed to maintain loop supervision. When a selected dialing button on the keypad is depressed, a transistor arrangement completes a powering path to the DTMF chip and to the speech network while the handsfree network is deenergized by shutting off the MOS transistor. The handsfree confidence tone muting resistor now attenuates the DTMF signal received by the handsfree hybrid, and also acts to block DC current from being shunted from the DTMF circuitry. In this condition, the hands free integrated circuits and other circuits are still powered by the independent power source in the form of a wall transformer in the handsfree circuit such that the DTMF signal is heard through the loudspeaker.

BRIEF DESCRIPTION OF THE DRAWINGS

The above-mentioned and other objects and features of the present invention and the manner of obtaining them will become more apparent by reference to the following description taken in conjunction with the drawing, the single FIGURE of which is a schematic diagram of an embodiment of the handsfree telephone instrument in accordance with the principles of the present invention.

DESCRIPTION OF THE PREFERRED EMBODIMENT

In the drawing there is shown the circuit of a telephone instrument for connection to a telephone line over the tip (T) and ring (R) leads, over which the circuit shown is powered from the line. The instrument to which the circuit is applied is a handsfree telephone usable in the handset mode under control of the hookswitch (HKSW) or in the handsfree mode under the control of the hookswitch and an additional handsfree switch (H/F). Not shown as part of the instrument is the handsfree network itself which may be of any conventional type such as that shown in U.S. Pat. No. 3,725,585 (noted previously). Also not shown is the speech network which may be of any conventional type such as that shown in U.S. Pat. No. Re. 25,507 issued Jan. 7, 1964 to L. Meacham.

A digital dual tone multi-frequency (DTMF) generator U1 is shown which may be of the type sold by American Microsystems, Inc. as a stock item uder the model number S 2859. The DTMF generator may include the added features shown in U.S. patent application Ser. No. 218,054, as noted previously. Such a generator responds to the depression of a button within the conventional key pad or keyboard K1 within an array of columns and rows to generate two signals, a row signal and a column signal. The signals are generated digitally within the generator chip U1 to produce output sinusoidal waveforms through output driver transistor Q1 on the lead labelled Output to the speech network (not shown). When a button on keyboard K1 is depressed, transistors Q2 and Q3 are turned off in a sequence to provide muting on the Tx and Rx leads for the transmitter and receiver, respectively, as explained in the application noted. The MOS transistor Q4 is used to shunt the receiver at the start and at the end of dialing, i.e. the period of output from the DTMF generator on lead labeled Output. The tone output on the output lead is transmitted to the line from the speech network (not shown).

When the receiver is to be muted, the Rx mute output of the chip UI (pin 11) is driven down to the voltage level Vss for the purpose of shutting off the normally operative transistor Q3. However, the internal drop of the IC driver Q3 will not allow the potential to go down all the way to Vss, allowing transistor Q3 to remain slightly conducting for at least part of the AC tone generation cycle. With this transistor on, distortion products are created which add to the undistorted confidence tone bled around transistor Q3 by R5. The diode D18 is held reverse biased by the collector to emitter leakage current of transistor Q3, thus preventing the residual flow of current into the base of Q3 and keeping Q3 in the fully cut-off condition.

The digital DTMF generator does not have common switches such as shown by U.S. Pat. No. 3,109,071 (noted previously), thus the features performed by the common switches must be performed by switching circitry externally of the chip.

The switching is performed by diodes D9-14, transistors Q5-Q7 and their attendant components such as resistors, capacitors and diodes. Diodes D9-D11 isolate the column leads from one another to prevent inaccuracies in outputs generated in response to button depressions. Diodes D12-D14 act to prevent leakage currents from the base of transistor Q5 from reaching the column inputs to the DTMF chip U1 and causing false tone outputs.

With the instrument in the loudspeaking or handsfree mode, i.e., the hookswitch HKSW in the on-hook position and the handsfree switch H/F closed; the MOS transistor Q7 is turned on. A path may be traced from the bridge rectifier (D4-D7) on lead L1, the on hook position of the hookswitch HKSW, handsfree switch H/F, resistor R11 and diode D8 to the gate of transistor Q7. This transistor switches on to complete the path through transistor Q7 to its source terminal and lead L2 to the bridge rectifier. With transistor Q7 on, the handsfree hybrid H/F is across the line. Once switched on, transistor Q7 remains switched on by the zener diode D16 connected to the transistor drain terminal. The zener diode has a switching level of 2.7 volts and the transistor Q7 has a switching threshold of 3.0 volts. The d.c. voltage drop across the handsfree hybrid in addition to the zener voltage combine to provide enough voltage to maintain MOS transistor saturated or "on hard." In this condition, (the handsfree mode) there is no power to the logic circuit on lead L3 due to the open circuit condition at the hookswitch.

It is of course well-known that DTMF tone signals for a telephone instrument in the handsfree mode should be received by the handsfree network but in a muted condition. This muting function is the purpose of resistor R13. With transistor Q7 off, the resistor in series with the handsfree hybrid H/F and the hybrid are across the line. Resistor R13 in this condition attenuates and mutes DTMF tones reaching the hybrid H/F. When no dialing is taking place, signals between the line and H/F hybrid are not to be muted. For this purpose, transistor Q7 is switched on to shunt resistor R13 and switch the hybrid across the line in series with transistor Q7 and capacitor C4.

When a button of the key pad K1 is depressed, a row switch and a column switch are closed to place ground (Vss) through the selected button and diode of the group D9-D11 to transmit this ground through resistor R9 to the base of transistor Q5. (The row switch has no function other than its initiation of a tone generation and need not be described further). The ground which is approximately 0 volts causes transistor Q5 to turn on and place more than 3 volts of lead L1 across the transistor Q5 to power lead L3 to the logic circuit and the DTMF chip through terminal Vdd.

With transistor Q5 turned on and transistor Q7 off, the more than 3 volts on lead L3 is determined by the impedance of IC circuit U1 and the network. This voltage is transmitted through resistor R10 to the base of transistor Q6. This transistor is turned on over a path through its emitter to the common or ground lead L2 and the bridge rectifier of D4-D7. With transistor Q6 turned on, the collector of transistor Q6 drops to the level of the ground of lead L2. This voltage level on the anode of diode D8 reverse biases the diode to the gate of MOS transistor Q7, the transistor thereby acting as an inverter. Transistor Q7 is now biased only by the charge on capacitor C4 and after a time delay which may approximate 5 milliseconds, transistor Q7 shuts off. This time delay limits and reduces any transient generated at the start of the tone generation. With transistor Q7 off, the H/F hybrid is disabled and in combination with resistor R25 attenuates any DTMF tones from passing through the handsfree hybrid to the handsfree or H/F network while allowing confidence tone to be sent to the receiver.

With the logic circuit and chip powered and the path to the handsfree network open, the DTMF tones generated by the chip are emitted through terminal 17 on the chip to transistor Q1 and the Output lead. The muting leads Tx and Rx of the chip emit their timed outputs to mute the transmitter and receiver by turning on transistors Q2 and Q3, respectively.

At the end of the period of depression of the selected keypad button, the ground is removed from the lead L4 and the base of transistor Q5. Transistor Q5 shuts off removing power from lead L3. With transistor Q5 turned off, the base of transistor Q6 is lowered and this transistor shuts off. Diode D8 is now forward biased over lead L1 and resistor R11. With the diode forward biased, the voltage on the gate of transistor Q7 rises to above its operating threshold and the transistor is turned on. Confidence tone muting resistor R13 is again shunted and a d.c. loop can be traced from the handsfree hybrid through the drain of transistor Q7 and through the diode bridge to the telephone line.

As mentioned previously, the circuit shown is powered from the line over the tip and ring leads and the bridge comprised of diodes D4-D7. These diodes are connected across the tip and ring at all times and meet REA surge requirements. In addition, the protection circuit of diode D17 and varistor V2 combine to protect transistor Q5 in all conditions. When the hookswitch is in the off hook condition, lead L1 is connected to lead L3 to power the logic circuit of transistors Q1-Q4 directly from the line. In the event of a current surge through leads L1 and L3, the surge passes through diode D17 and varistor V2 bypassing transistor Q5. In the handsfree mode with the hookswitch on hook and the handsfree switch H/F closed, any surge passing through the bridge is shunted by varistor V2. In the on hook condition, the present circuit can withstand a surge equal to the reverse break down voltage of the bridge diodes.

Thus, the circuit as shown switches power to the logic, speech network and DTMF chip only when a key pad button is depressed with the circuit in the handsfree mode. This power is removed when the button depression is terminated. The confidence tone muting resistor R13 mutes any a.c. signals such as the generated DTMF tones during the button depression or dialing condition. The switching circuit is protected against surges both in the off hook state of the handset mode and in the handsfree mode with the hookswitch off hook or on hook. The switching network is also protected against transients at the start of dialing and from leakage currents generated at the DTMF chip.

To implement the circuit as shown, componenets having the following values have been found successful.

| | |
|---|---|
| C1 | .015 microfarad, 50 V |
| C2 | .0068 microfarad, 50 V |
| C3 | .0068 microfarad, 50 V |
| C4 | .01 microfarad, 50 V |
| R1 | 10K. ohms |
| R2,R3 | 3.3K. ohms |
| R4 | 100 ohms |
| R5 | 5.1K. ohms |
| R6 | 470K. ohms |
| R7 | 10 ohms |
| R8 | 2.0K. ohms |
| R9 | 7.5K. ohms |
| R10 | 39K. ohms |
| R11 | 10K. ohms |
| R12 | 560K. ohms |
| R13 | 33K. ohms |

What is claimed is:

1. A circuit for operating a telephone instrument settable into either a normal mode or a handsfree mode with said instrument including a digital dual tone multifrequency (DTMF) generator responsive to actuation of a selected one of a plurality of manual DTMF switches to operate a pair of tones representative of the actuated switch, said circuit comprising circuit means responsive to said actuation of said selected one of said plurality of DTMF switches for switching power to said DTMF generator and to an intermediate network of said instrument to which said tones generated by said DTMF generator are transmitted for subsequent transmission to a telephone line, said tones also being coupled to a handsfree network, said circuit means comprising first switching means rendered operative in response to said actuation of said selected one of said plurality of DTMF switches, second switching means slaved to said first switching means and rendered operative in response to operation of said first switching means, time delay means initiated responsive to operation of said second switching means to time a period, third switching means normally operated with said instrument in its handsfree mode to complete a path from said handsfree network to said line, said third switching means rendered inoperative at the end of said time delay period to attenuate said path from said line to said handsfree network and to mute transmission of said tones to said handsfree network, said third switching means being rendered operative upon release of said selected one of said plurality of DTMF switches to again complete said path between said handsfree network to said line.

2. A circuit as claimed in claim 1, in which said third switching means is an MOS transistor and in which there are means for saturating said MOS transistor at low line currents to turn said MOS transistor on when said selected one of said plurality of DTMF switches is released.

3. A circuit as claimed in claim 2, in which said first and second switching means comprise PNP and NPN transistors, respectively, coupled in a collector to base relationship.

4. A circuit as claimed in claim 3, in which there is a tone muting resistor coupled in a shunt relationship with said third switching means, said resistor being coupled in series with said handsfree network on said third switching means being rendered inoperative.

5. A circuit for controlling a telephone instrument operative in a handset mode or a handsfree mode, in which said instrument is equipped with a digital multifrequency generator which is responsive to the depression of any selected one of a plurality of buttons in a manually actuatable key pad to transmit a dual tone signal through a logic network of said instrument to a telephone line, and in which said instrument in the handset mode powers the generator and speech network from the telephone line continuously and in which there are means for switching between the handset and handsfree modes, the circuit comprising means for powering said logic network and said generator from said line in the handsfree mode, said powering means including a first switching means normally maintained in a saturated condition to maintain said handsfree network across the telephone line with the instrument in the handsfree mode, said powering means including second switching means responsive to depression of any selected button of said key pad for completing a powering path to said generator and to said logic network over said line, time delay means responsive to operation of said second switching means for turning off said first switching means after the expiration of a timed period, a tone muting resistor coupled across the telephone line with said first switching means turned off, and voltage level means in series with said first switching means for operating said first switching means fully after restoration of said second switching means.

6. A circuit as claimed in claim 5, in which said second switching means comprises a first and a second transistor, said first switching means comprises an MOS transistor and said voltage level means comprises a zener diode.

7. A circuit as claimed in claim 6, in which there are means for protecting said second switching means from the line with the instrument operative in the handset mode and with the instrument operative in the handsfree mode, said protecting means comprising a path in shunt of the emitter collector path of said second transistor.

8. A circuit as claimed in claim 7, in which there are further protecting means for said second transistor interposed in a path from said key pad for operating said second switching means.

9. A circuit as claimed in claim 5, in which said tone muting resistor is coupled to said first switching means to be shunted by said first switching means with said first switching means in the on condition.

10. A handsfree telephone instrument coupled to a telephone line, said instrument including a digital dual tone multifrequency generator for transmission of selected tones to said line in response to operation of switches of a key pad, and in which said generator comprises an integrated circuit for the digital generation of said tones, a tone output network responsive to tones emitted by said generator for transmitting generated tones for transmission to said line, a first transistor coupled to said line for operation with said instrument in its handsfree mode for switching a handsfree network of said instrument across said line, a transistor network activated responsive to operation of any one of said switches for coupling said generator to said line to activate said generator, inverter means responsive to the activation of said transistor network for shutting off said first transistor, a muting resistor in series with said handsfree network of said instrument for muting tones of said handsfree network when said first transistor is shut off, said first transistor being operated on the termination of transmission of tones by said generator for shunting said muting resistor to switch said handsfree network across said telephone line for the bidirectional transfer of alternating current signals thereacross.

11. A telephone instrument as claimed in claim 10, in which there are isolating means interposed between said switches and said transistor network and between said switches and said generator to isolate said switches from false signalling to said transistor network and said generator.

12. A telephone instrument as claimed in claim 10, in which said instrument includes leads to a receiver and a transmitter; in which said generator generates signals for muting said transmitter and said receiver during transmission of generated tones therefrom, and in which there are muting transistors responsive to muting signals from said generator for emitting further signals on said leads to mute said receiver and said transmitter, and in which there are means responsive to said muting signals for reverse biasing at least one of said transistors during the generation of said muting signals to cause said transistor to shut off and remain off during the transmission of output tone signals.

* * * * *